(12) United States Patent
Lin et al.

(10) Patent No.: US 6,986,865 B2
(45) Date of Patent: Jan. 17, 2006

(54) METHOD FOR MANUFACTURING AN ELECTROSTATIC CHUCK

(75) Inventors: Hongy Lin, Chesterfield, MO (US); Jason Eugene Smith, Springfield, IL (US); Thomas Michael Laskowski, Pacific, MO (US)

(73) Assignee: Watlow Electric Manufacturing Company, St. Louis, MO (US)

( * ) Notice: Subject to any disclaimer, the term of this patent is extended or adjusted under 35 U.S.C. 154(b) by 528 days.

(21) Appl. No.: 10/192,803

(22) Filed: Jul. 10, 2002

(65) Prior Publication Data

US 2004/0007800 A1 Jan. 15, 2004

(51) Int. Cl.
  *C04B 33/32* (2006.01)

(52) U.S. Cl. .................. 264/619; 264/618; 264/658
(58) Field of Classification Search ............... 264/614, 264/619, 618, 658; 419/11
  See application file for complete search history.

(56) References Cited

U.S. PATENT DOCUMENTS

| | | | |
|---|---|---|---|
| 5,104,834 A | 4/1992 | Watanabe et al. | 501/127 |
| 5,191,506 A | 3/1993 | Logan et al. | 361/234 |
| 5,207,437 A | 5/1993 | Barnes et al. | 279/128 |
| 5,382,469 A | 1/1995 | Kubota et al. | 428/332 |
| 5,535,507 A | 7/1996 | Barnes et al. | 29/825 |
| 5,566,043 A | 10/1996 | Kawada et al. | 361/234 |
| 5,583,737 A | 12/1996 | Collins et al. | 361/234 |
| 5,600,530 A | 2/1997 | Smith | 361/234 |
| 5,607,541 A | 3/1997 | Kubota et al. | 156/538 |
| 5,634,266 A | 6/1997 | Sherstinsky et al. | 29/825 |
| 5,671,117 A | 9/1997 | Sherstinsky et al. | 361/234 |
| 5,748,436 A | 5/1998 | Honma et al. | 361/234 |
| 5,864,459 A | 1/1999 | Lu et al. | 361/234 |
| 5,867,359 A | 2/1999 | Sherman | 361/234 |
| 5,880,922 A | 3/1999 | Husain | 361/234 |
| 5,903,428 A | 5/1999 | Grimard et al. | 361/234 |
| 5,905,626 A | 5/1999 | Logan et al. | 361/234 |
| 5,909,354 A | 6/1999 | Harada et al. | 361/234 |
| 5,909,355 A | 6/1999 | Parkhe | 361/234 |
| 5,946,183 A | 8/1999 | Yamada et al. | 361/234 |
| 6,001,760 A | 12/1999 | Katsuda et al. | 501/98.4 |
| 6,017,485 A * | 1/2000 | Enck et al. | 264/618 |
| 6,028,762 A | 2/2000 | Kamitani | 361/234 |
| 6,051,303 A | 4/2000 | Katsuda et al. | 428/138 |
| 6,108,189 A | 8/2000 | Weldon et al. | 361/234 |
| 6,122,159 A | 9/2000 | Arai et al. | 361/234 |
| 6,134,096 A | 10/2000 | Yamada et al. | 361/234 |
| 6,141,203 A | 10/2000 | Sherman | 361/234 |
| 6,215,642 B1 | 4/2001 | Sogard | 361/234 |
| 6,268,994 B1 | 7/2001 | Logan et al. | 361/234 |
| 6,272,002 B1 | 8/2001 | Mogi et al. | 361/234 |
| 6,310,755 B1 | 10/2001 | Kholodenko et al. | 361/234 |

FOREIGN PATENT DOCUMENTS

WO  WO01/43184  6/2001

* cited by examiner

*Primary Examiner*—Dionne A. Walls
*Assistant Examiner*—Carmen Lyles-Irving
(74) *Attorney, Agent, or Firm*—Harness, Dickey & Pierce, P.L.C.

(57) ABSTRACT

A method for manufacturing an electrostatic chuck is disclosed wherein a sintered ceramic body having a dielectric layer made from Alumina (Al2O2) and Titanium Nitride (TiN) having a specific range of particle size is heat treated in an oxygen-rich environment in order to produce a uniform dielectric layer having no pores or micro-cracks.

16 Claims, 7 Drawing Sheets

| Average thickness, um | Standard deviation, um | Range (Max-Min), um |
|---|---|---|
| 249.8 | 3.7 | 240.5-260 |

Fig. 3

| TiN size | 6.0 um | 4.75 um | 3.5 um | 2 um | 0.75 um |
|---|---|---|---|---|---|
| Microcracks | Yes | Yes | No | No | No |

Fig. 7

METHOD FOR MANUFACTURING AN ELECTROSTATIC CHUCK

BACKGROUND OF THE INVENTION

1. Field of the Invention

The present invention relates to electrostatic chucks, and more particularly to electrostatic chucks used to support a substrate. More specifically, the present invention relates to a method for manufacturing an electrostatic chuck having an extremely uniform dielectric layer with no pores or microcracks.

2. Prior Art

Typically, electrostatic chucks are used as a clamping surface for electrostatically securing a semiconductor wafer thereon during a vapor deposition or etching process. An electrostatic chuck may comprise a sintered ceramic structure having an electrode interposed between a dielectric layer and a ceramic insulation material with a conductive path established from the electrode through the ceramic insulation material. In operation, an electrical potential is applied to the conductive path through a terminal lead connected thereto that energizes the electrode of the electrostatic chuck. When energized, an electrostatic force is generated between an external electrode, such as a semiconductor wafer, and the internal electrode embedded inside the electrostatic chuck.

One method for manufacturing an electrostatic chuck having an embedded electrode includes forming a first layer of a green ceramic material, screen printing a film electrode onto the first layer, depositing a second layer of the green ceramic material over the screen printed electrode and sintering the resulting ceramic structure. However, electrostatic chucks made with this method of manufacture can display fluctuations or non-uniformities in the thickness of the dielectric layer as well as extremely small cracks and pores which can adversely affect the chuck's ability to electrostatically secure the substrate to the chucking surface.

Therefore, there appears a need in the art for a method of manufacturing an electrostatic chuck having a dielectric layer with no pores or microcracks. There also appears a need in the art for a method of manufacturing an electrostatic chuck having an extremely uniform dielectric layer with no fluctuations.

OBJECTS AND SUMMARY OF THE INVENTION

Accordingly, the primary object of the present invention is to provide an electrostatic chuck having an extremely uniform dielectric layer.

Another object of the present invention is to provide a method for manufacturing an electrostatic chuck that employs a novel heat oxidation process to a sintered ceramic structure in order to produce an extremely uniform dielectric layer.

A further object of the present invention is to provide a method of manufacturing an electrostatic chuck that uses a predetermined range of particulate size for the conductive material in order to produce a crack-free dielectric layer having no pores.

Yet another object of the present invention is to provide a method of manufacturing an electrostatic chuck that permits direct control of dielectric layer thickness.

Another further object of the present invention is to provide a method of manufacturing an electrostatic chuck wherein a ceramic structure comprising either a titanium nitride or carbide or other transition metal nitride or carbide is heat oxidized to form the dielectric layer.

These and other objects of the present invention are realized in the preferred embodiment of the present invention, described by way of example and not by way of limitation, which provides for a method of manufacturing an electrostatic chuck.

In brief summary, the present invention overcomes and substantially alleviates the deficiencies in the prior art by providing a method for manufacturing an electrostatic chuck comprising an internal electrode sandwiched between a dielectric layer and an underlying ceramic insulation material. The method of manufacturing according to the present invention comprises the steps of providing a fixed amount of alumina ($Al_2O_3$) powder with an organic binder (i.e. acrylic emulsion) that is poured into a metal die or mold and then flattened to cover the entire mold. The alumina powder is loosely compacted and a hollow tube inserted through the alumina powder to the bottom of the mold at the center of the compact. A predetermined amount of titanium nitride (TiN) and alumina mixture is fed through the inside of the tube to the top of the mold such that a conducting path is established for linking to an electrical charge source. The space of the mold outside the tube and above the alumina powder compact is filled with a titanium nitride and alumina mixture to serve as an electrically conductive electrode material that communicates with the conducting path.

Once the rest of the mold is filled with the titanium nitride and alumina mixture, the tube is pulled out of the mold without disturbing the compact so that the continuity of the conducting path is maintained. The entire contents of the mold is then pressed to form a rigid compact structure. Preferably, the compact structure is then sintered to form a ceramic structure which is machined to have flat and parallel surfaces by employing conventional methods known in the art.

In accordance with one aspect of the present invention, after the sintering and machining operations are completed, the ceramic structure is heat treated in an oxidative environment to create an extremely uniform dielectric layer along the electrode material.

In accordance with another aspect of the present invention, the thickness of the dielectric layer produced in the heat oxidation process may be precisely controlled by the particle size of the titanium nitride used in the electrode as well as heat oxidation time and temperature.

Additional objects, advantages and novel features of the invention will be set forth in the description which follows, and will become apparent to those skilled in the art upon examination of the following more detailed description and drawing in which like elements of the invention are similarly numbered throughout.

BRIEF DESCRIPTION OF THE DRAWINGS

FIG. 3 is a table showing the thickness of the dielectric layer created by the heat treatment method according to the present invention;

FIG. 7 is a table showing the presence or absence of microcracks as a function of titanium nitride particle size according to the present invention.

DETAILED DESCRIPTION OF THE INVENTION

Figure 1:
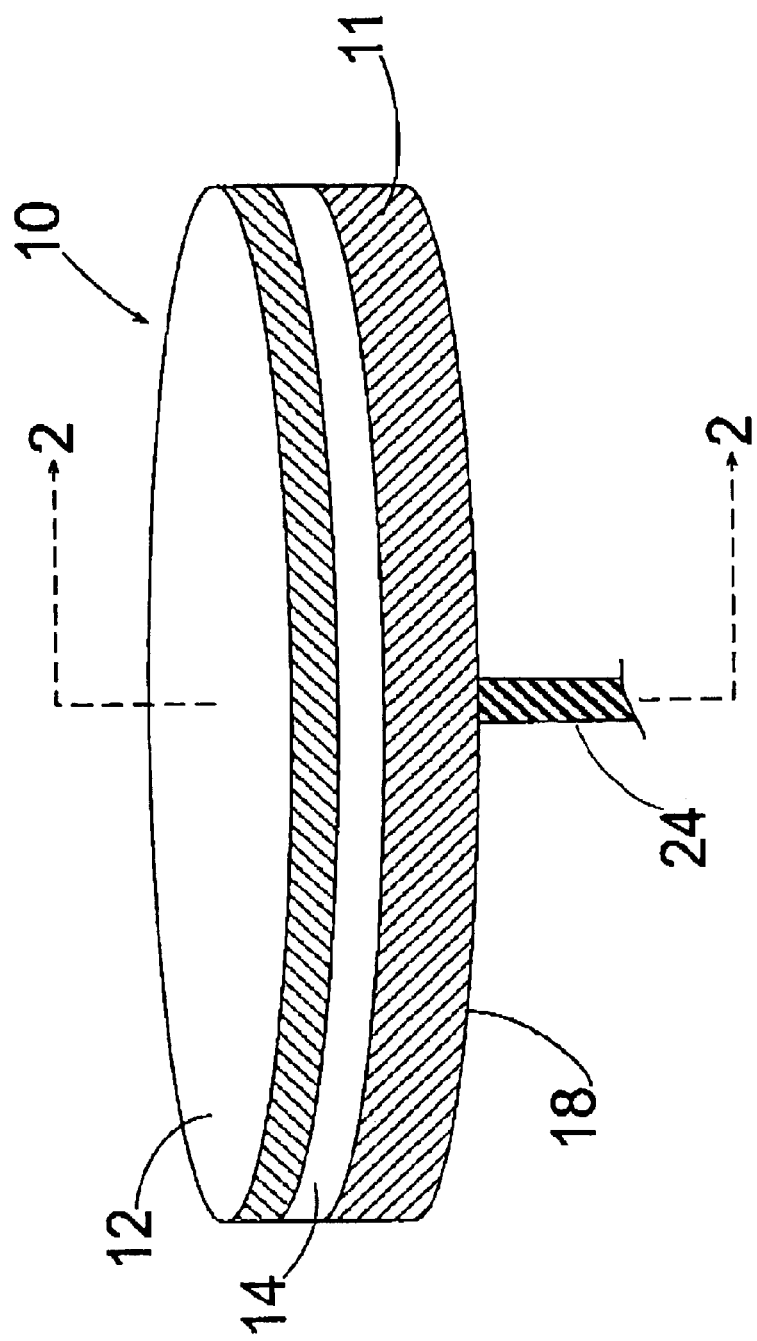
FIG. 1 is an exploded view of the electrostatic chuck and mold according to the present invention.
Figure 2:
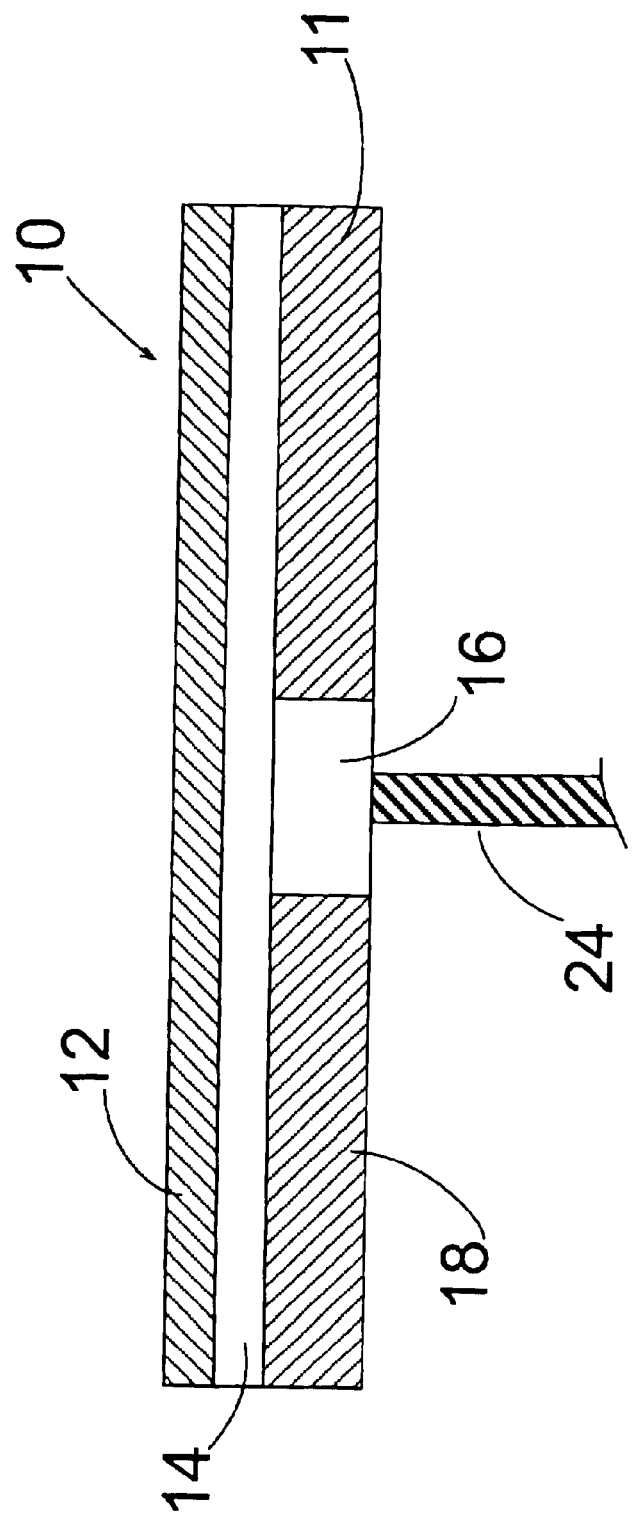
FIG. 2 is a cross sectional view of an electrostatic chuck taken along line 2—2 of FIG. 1 produced using the method according to the present invention.

Referring to the drawings, the electrostatic chuck manufactured using the method of the present invention is illustrated and generally indicated as 10 in FIG. 1. The electrostatic chuck 10 provides a surface and means for clamping a semiconductor wafer (not shown) or other substrate during a vapor deposition or etching process. Referring to FIGS. 1 and 2, the electrostatic chuck 10 comprises a disc-like body 11 having an electrode 14 sandwiched between a dielectric layer 12 formed on top of electrode 14 and a ceramic layer 18 formed on the bottom thereof. A conductive path 16 comprising an electrically conductive material is established through ceramic layer 18 for linking electrode 14 to a terminal lead 24 when energizing electrostatic chuck 10.

The method for manufacturing electrostatic chuck 10 according to the present invention comprises the steps of providing a predetermined amount of alumina ($AlO_3$) powder mixed with an organic binder (i.e. acylic emulsion) that is poured into a generally circular-shaped mold. The alumina powder is loosely compacted to the level shown by ceramic layer 18 (FIG. 2) and a hollow tube (not shown) inserted through the alumina powder to the bottom of mold at the center of the compact. An electrically conductive material comprising a predetermined amount of titanium nitride (TiN) and alumina mixture (i.e., 25% by weight of titanium nitride) is fed inside the hollow tube until the tube is completely filled from the bottom of mold to a level that is substantially even with the top of the compact in order to form conducting path 16. The conducting path 16 permits the electrode 14 of the electrostatic chuck 10 to be linked to an electrical charge source (not shown) through terminal lead 24.

To provide electrode 14, the area outside the tube and above the compact in mold is filled with a predetermined amount of titanium nitride and alumina mixture similar to the electrically conductive mixture contained in the conducting path 16. The tube is then gently pulled out of the compact without disturbing the arrangement of mixtures inside mold such that the continuity of the conducting path 16 is maintained.

The compact is then pressed to form a rigid compact structure, preferably using pressures ranging between 30–300 MPa, utilizing a uni-axial press and/or followed by isostatic pressing using methods known in the art. Once the compact structure is made, it is then preferably hot pressed using temperatures ranging from 1,400° C. to 1,700° C. with pressures between 10–40 MPa for a period of time of 1 to 8 hours which produces a ceramic structure. In the alternative, the compact structure can be sintered in a non-oxidative atomosphere using temperatures of 1,500° C. to 1,800° C., in pressures ranging between 10–40 Mpa for a period of time from 1 to 8 hours.

The resultant ceramic structure may then be machined to have flat and parallel surfaces by conventional grinding methods known in the art. Preferably, a diamond grinding procedure using 75 or 125 um is employed during the grinding process.

In accordance with one aspect of the present invention, the ceramic structure is then heat treated in an oxidative environment using a temperature range of 1,000° C. to 1,400° C. for a period of time between 0.1 to 10 hours. This novel heat oxidation process produces an extremely uniform dielectric layer 12 along the top portion of electrode 14 by virtue of the reaction which transforms the electrically conductive titanium nitride of electrode 14 into a nonconductive dielectric titanium oxide ($TiO_2$) as set forth in the formula below:

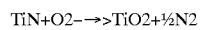

$$TiN + O_2 \rightarrow TiO_2 + \tfrac{1}{2}N_2$$

The applicants have discovered that the dielectric layer 12 resulting from this heat oxidation process of the ceramic structure produces a layer 12 that is extremely flat and uniform in thickness with standard deviation as shown in FIG. 3. The table in FIG. 3 illustrates that the dielectric layer 12 produced by the heat oxidation of the titanium nitride in the $TiN/Al_2O_3$ mixture of the electrode 14 ranges in thickness between 240.5 to 260 um having an average thickness of 249.8 um with a standard deviation of only 3.7 um.

If desired, the surface of dielectric layer 12, which normally has a roughness (Ra) of –0.5 um, can be further machined to achieve a flatness have a roughness of less than 0.5 um using conventional diamond polishing. Preferably, the polishing process employs 0.5 um diamond particles and/or 0.05 um colloidal silica to properly polish the surface of dielectric layer 12. The inventors have discovered that this polishing step eliminates the need for costly additional grinding & lapping steps which can significantly lower the cost of making the electrostatic chuck 10.

Once the electrostatic chuck 10 is manufactured according to the present invention, a terminal lead wire 24, made from nickel or silver plated copper wire can be brazed or soldered onto the center of the conducting path 16 for connection to an electrical source. For low temperature applications, a soldering process using a silver-tin-titanium alloy can be applied to bind the terminal lead wire 24 at temperatures between 260–420° C. For high temperature applications, an active brazing alloy, such as TICUSIL, may be used to bind the terminal lead wire 24 at a processing temperature of about 900° C. under vacuum or inert atmosphere.

Figure 6:
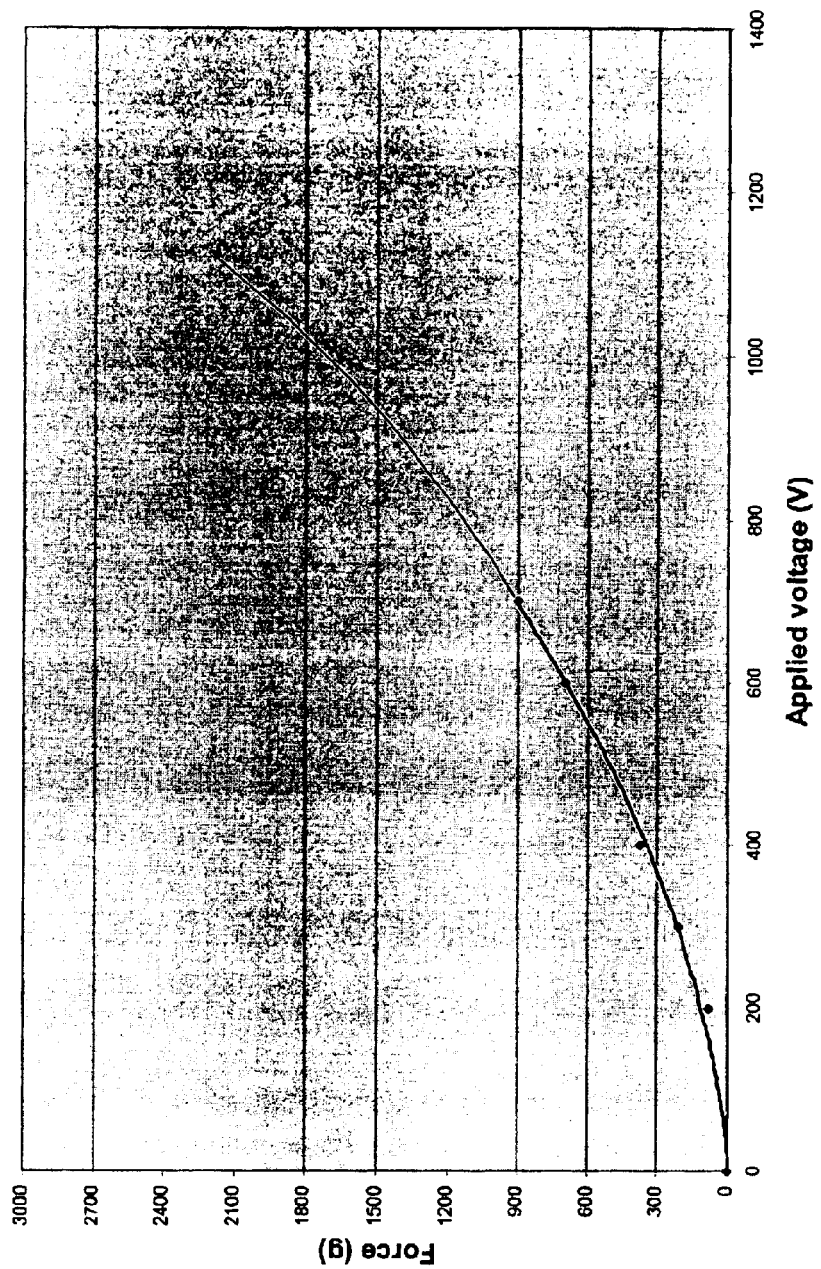
FIG. 6 is a graphic representation illustrating the clamping force as a function of applied voltage according to the present invention.

Referring to FIG. 6, the electrostatic chuck 10 manufactured using the method of the present invention has a clamping force that is a function of the applied voltage shown in the equation set forth below:

$$F(V) = \in V_2/2(Hd/k + Hgap)2$$

wherein V is applied voltage; $\in$ is the permittivity of vacuum; Hd and Hgap are the thickness of the dielectric layer 12 and airgap (not shown), respectively; and K is the relative dielectric constant of the dielectric layer 12. The inventors have discovered that the pressure exerted on the wafer or substrate by the electrostatic chuck 10 was 7000 Pa when a bias of 900V was applied at a room temperature of 23° C.

In accordance with another aspect of the present invention, the inventors have found that the thickness of dielectric layer 12 can be precisely controlled by manipulating the ratio of titanium nitride to alumina used in the electrically conductive material of electrode 14, the particle size of the titanium nitride, and the heat oxidation time and temperature used in the heat oxidation process. For example, a dielectric layer 12 with a thickness of 50–300 um can be obtained without any surface cracking or delamination occurring by using the method of the present invention.

Figure 5:
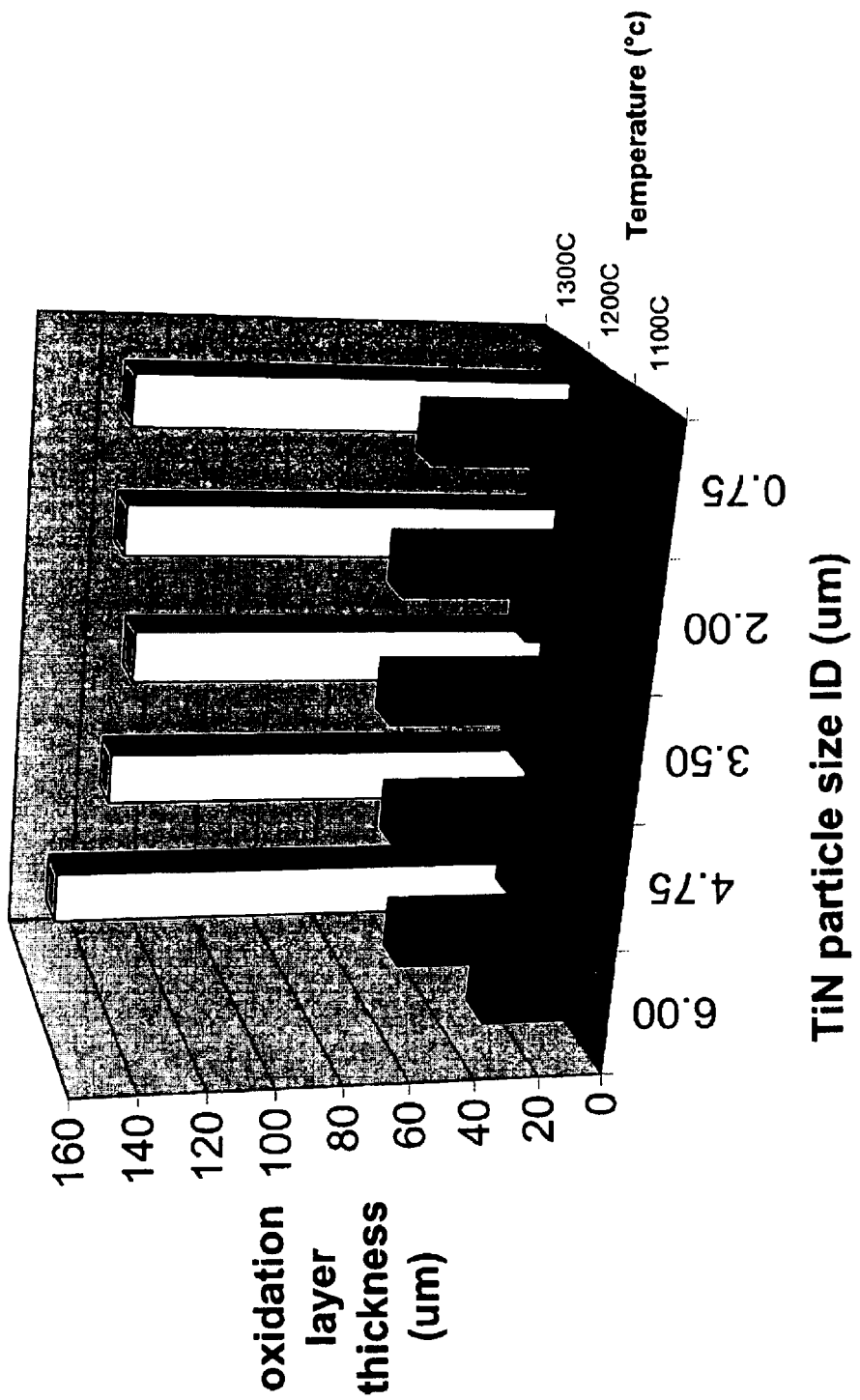
FIG. 5 is a graphic representation illustrating the effect of oxidation temperature and titanium nitride particle size on the thickness of the dielectric layer formed along the electrode according to the present invention.

Referring to FIGS. 5 and 7, the thickness of the dielectric layer 12 may also be increased as a function of heat oxidation time during the heat oxidation process. For example, although the particle size of the titanium nitride in electrode 14 does not appear to significantly affect the thickness of dielectric layer 12 when the temperature of the heat treatment process is below 1,300° C., the thickness of the dielectric layer 12 appears to increase when formed from electrode 14 material comprising titanium nitride having a particle size of 6 um oxidized at a temperature of 1,300° C. It was found that the thickness of the oxidized dielectric layer 12 formed from electrode 14 using larger titanium nitride particles size, e.g. 6 um, achieved around a 10% increase in the thickness of the dielectric layer 12 when compared with electrode 14 material containing smaller particle sizes of titanium nitride, e.g. 4.75–0.75 um. This relationship is illustrated in FIG. 5 which shows the effect of oxidation temperature and titanium nitride particle size on the thickness of the dielectric layer 12 for a period of one hour.

The resultant dielectric layer 12 manufactured using the method of the present invention is relatively dense and has only an extremely small amount of porosity, for example, less than 1% porosity for the entire dielectric surface 12. Further, the dielectric layer 12 shows a uniform grain structure having an average grain size of 7 um.

Figure 4:
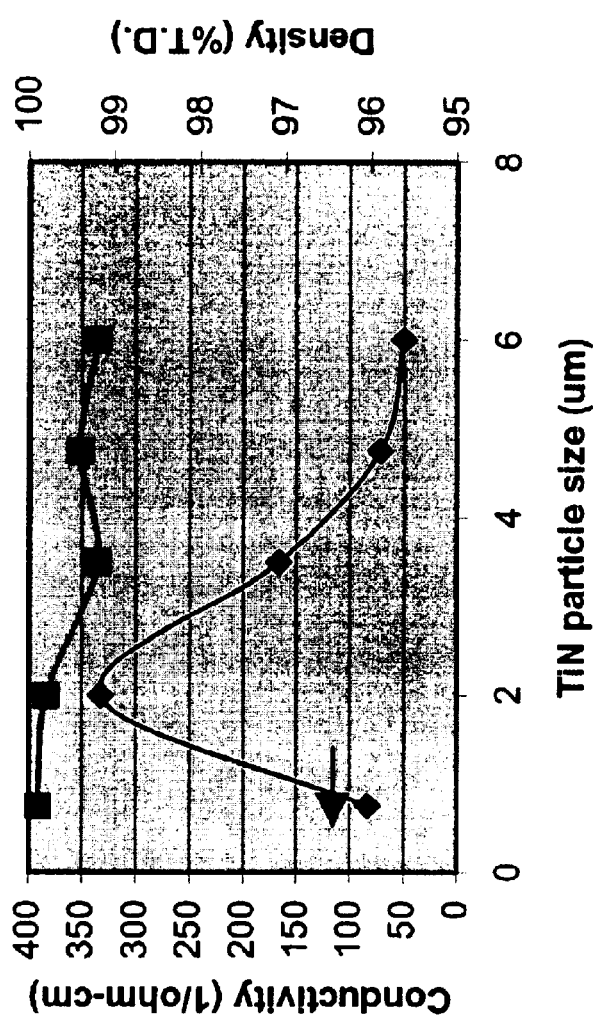
FIG. 4 is a graphic representation illustrating the increase and decrease in the electrical conductivity of an electrode based on the particle size of the titanium nitride used in the method according to the present invention.

In accordance with yet another aspect of the present invention, the inventors have also found that the conductivity of electrode 14 can be controlled by the varying the concentration of titanium nitride used in the TiN/Al$_2$O$_3$ mixture, the particle size of the titanium nitride in the TiN/Al$_2$O$_3$ mixture, and controlling certain processing parameters, such as sintering time and temperature. Referring to FIG. 4, the inventors have discovered, for example, that with a concentration of titanium nitride of about 25 percent by weight in the TiN/Al$_2$O$_3$ mixture, the conductivity of electrode 14 increases when the particle size of the titanium nitride is between 2–6 um, while the conductivity decreases significantly when the particle size is 0.75 um or below.

The present invention contemplates that the particle size of the titanium nitride is also critical in producing a crack-free dielectric layer being formed during oxidation process of the inventive method. Referring to FIG. 7, it has been discovered that a titanium nitride particle size of 3.5 um or smaller produced no surface micocracks in the dielectric layer.

Preferably, the material for the electrode 14 and ceramic layer 18 used to manufacture the electrostatic chuck 10 are made from a powder; however, a conventional green tape made from the same materials can be used in the present inventive method in lieu of powder without departing from the spirit of the invention.

Preferably, the acrylic emulsion used as an organic binder is a Rohm & Hass B1002, although any suitable organic binder such PVA, PVB, etc., is felt to fall within the scope of the present invention.

It should be understood from the foregoing that, while particular embodiments of the invention have been illustrated and described, various modifications can be made thereto without departing from the spirit and scope of the invention. Therefore, it is not intended that the invention be limited by the specification; instead, the scope of the present invention is intended to be limited only by the appended claims.

What is claimed is:

1. A method for manufacturing an electrostatic chuck comprising the steps of:
   a) pouring a predetermined amount of an insulation material into a mold;
   b) creating a hollow pathway through said insulation material;
   c) pouring a predetermined amount of a conductive material into said hollow pathway to establish a conductive path;
   d) pouring a predetermined amount of said conductive material on top of said insulation material and said conductive path to produce a compact;
   e) removing said compact from said mold;
   f) pressing said compact to form a compact structure;
   g) sintering said compact structure to form a ceramic structure under a non-oxidative atmosphere; and
   h) heat treating said compact ceramic structure in an oxygen-rich environment.

2. The method according to claim 1, wherein said insulation material comprises alumina.

3. The method according to claim 1, wherein said conductive material comprises a mixture of titanium nitride and alumina.

4. The method according to claim 1, wherein said step of pressing the compact further comprises using pressures ranging between 5,000–50,000 psi.

5. The method according to claim 1, wherein said step of sintering comprises a hot pressing procedure using a temperature range of between 1,400–1700 C and a pressure range of 10–40 Mpa for a period of 1–8 hours.

6. The method according to claim 1, wherein said step of sintering comprises a sintering procedure in a nitrogen-rich environment using a temperature range of 1,500–1,800 C using a pressure range of 10–40 Mpa for a period of 1–8 hours.

7. The method according to claim 1, wherein said step of heat treating comprises a heating process in an oxidative environment.

8. The method according to claim 1, wherein said heating process comprises a heating process in an oxidative environment using a temperature range of 1,000–1,400 C. for a period of time between 0.1 to 10 hours.

9. The method according to claim 1, wherein said step of creating said a hollow pathway comprises inserting a hollow tube through the center of said insulation material.

10. The method according to claim 1, wherein the step of pouring a predetermined amount of said conductive material comprises pouring said conductive material into a hollow tube.

11. The method according to claim 10, comprising the additional step of pulling out the hollow tube from said insulation material after pouring a predetermined amount of said conductive material on top of said insulation material and said conductive path to produce a compact.

12. A method for manufacturing an electrostatic chuck comprising the steps of:
   a) providing a compact comprising an insulation material and an electrode formed adjacent said insulation material with a path of conductive material formed through said insulation material;
   b) sintering said compact; and
   c) heat treating said sintered compact in an oxygen-rich environment such that a uniform dielectric layer is formed along the electrode layer having no pores or microcracks.

13. A method for manufacturing an electrostatic chuck comprising the steps of:

a) providing a sintered compact comprising an electrode and a ceramic layer; and b) heat treating the sintered compact in an oxygen-rich environment to produce a uniform dielectric layer along the electrode.

14. A method for controlling the thickness of a dielectric layer for an electrostatic chuck comprising the steps of:

a) providing a sintered compact comprising an electrode material having a predetermined particle size; and b) heat treating the sintered compact in an oxygen-rich environment in order to produce a dielectric layer along said electrode material, wherein the thickness of said dielectric layer is directly related to the particle size of the electrode material.

15. The method according to claim 14, wherein the electrode material comprises titanium nitride.

16. The method according to claim 15, wherein the particle size of the titanium nitride is 6 um or larger.

* * * * *